Oct. 25, 1960
A. S. VOLPIN
2,957,492
GATE VALVE CONSTRUCTION
Filed Aug. 24, 1959
4 Sheets-Sheet 1
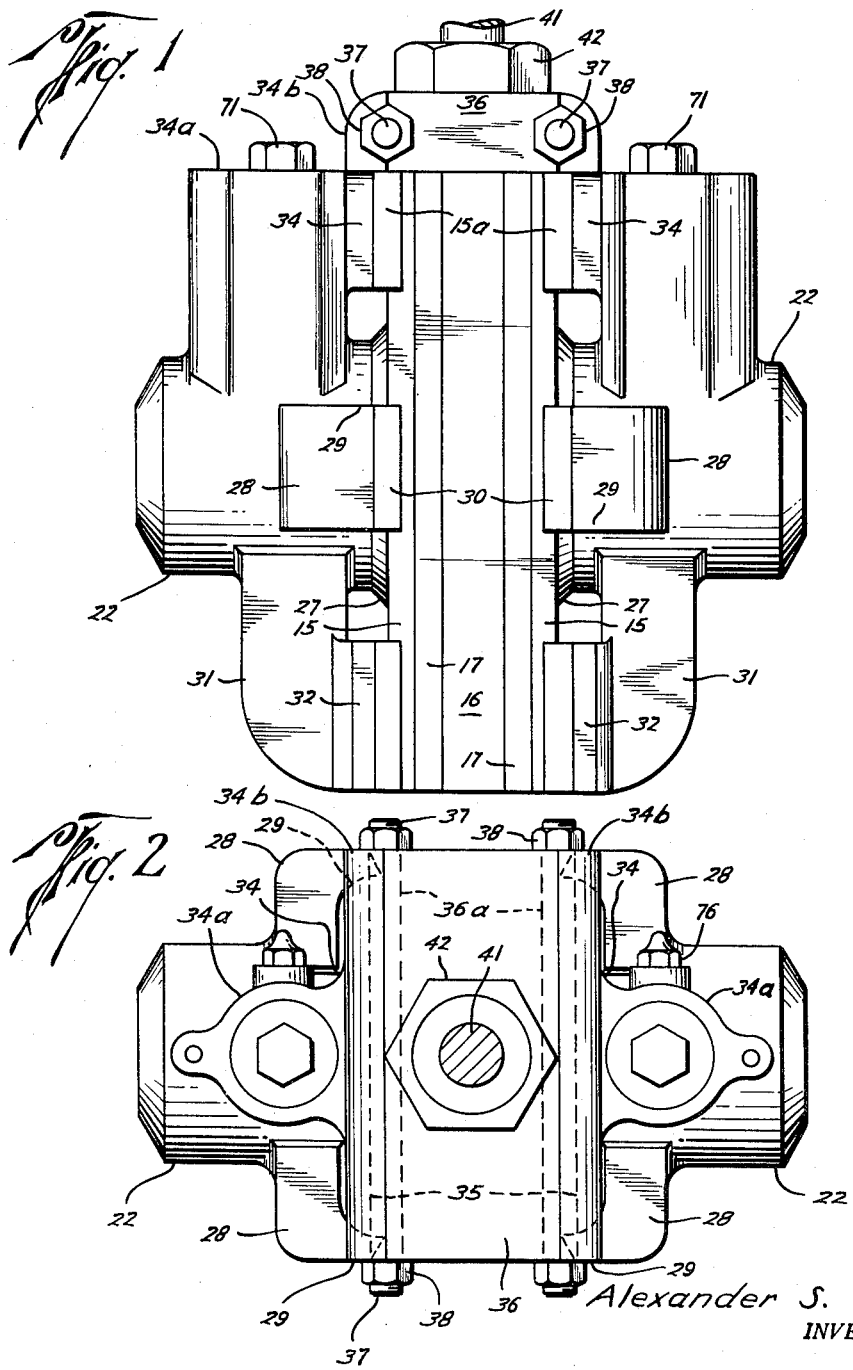
Alexander S. Volpin
INVENTOR.
BY
ATTORNEY

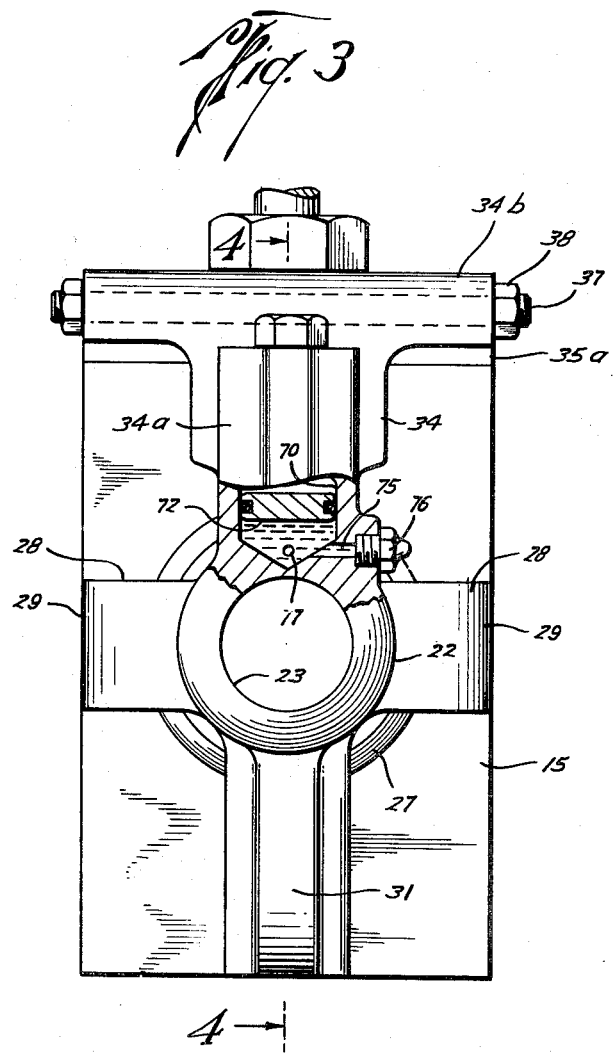

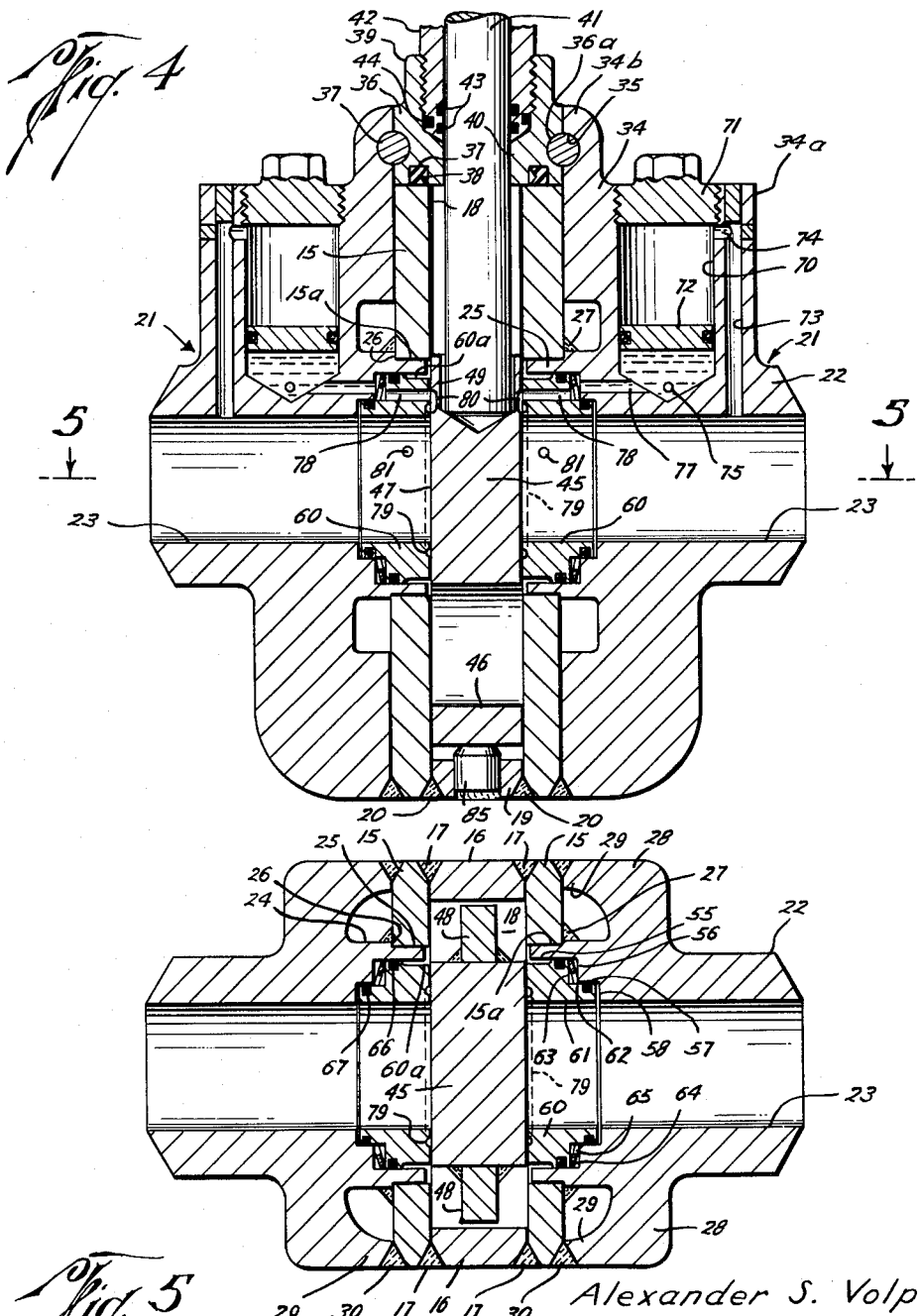

Oct. 25, 1960
A. S. VOLPIN
2,957,492
GATE VALVE CONSTRUCTION
Filed Aug. 24, 1959
4 Sheets-Sheet 4
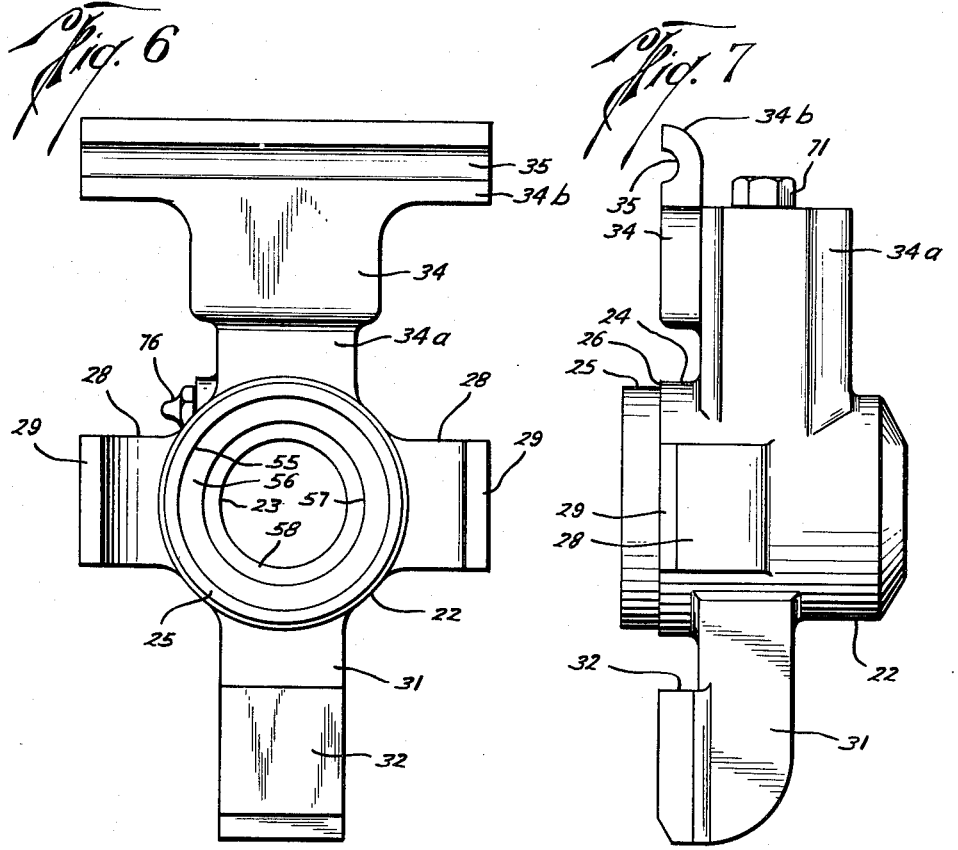
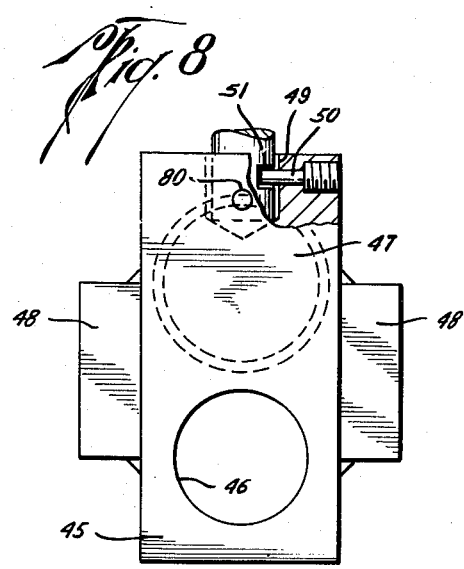
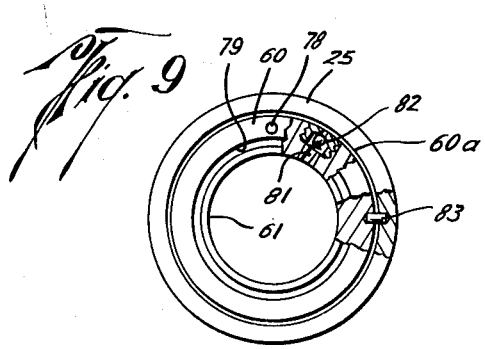
Alexander S. Volpin
INVENTOR.
BY
ATTORNEY

United States Patent Office 2,957,492
Patented Oct. 25, 1960

2,957,492
GATE VALVE CONSTRUCTION
Alexander S. Volpin, 10200 W. Broadview Drive, Miami Beach, Fla.
Filed Aug. 24, 1959, Ser. No. 835,558
8 Claims. (Cl. 137—246.12)

This invention relates to gate valves, and more particularly to the construction of through-conduit type gate valves of relatively large sizes having flow passages 10 inches in diameter and larger.

In construction of gate valves it has been common practice to form the body and its inlet and outlet connections from single castings, these castings then being machined to receive the seats, gates and other parts of the valve. While such construction has been satisfactory for valves of smaller sizes and for use at relatively lower pressures, large size valves of the sizes mentioned above, and particularly for higher operating pressures, require castings which become very large, heavy and costly, and are subject to the numerous defects commonly found in cast metal structures, such as blow-holes, or porous spots, and the like.

To overcome the defects in such conventional constructions, the present invention is directed to a valve construction employing what is generally referred to as a fabricated construction, that is, the valve body is constructed, in a large measure, from steel plate, the sections of which are welded together in an appropriate manner to provide a construction which is not only strong, but which permits manufacture of valves in the larger sizes with a minimum of weight.

A primary object of this invention, therefore, is to provide a fabricated gate valve body employing novel re-enforcing arrangements for supporting the walls of the body, the walls being constructed of steel plate.

An important object is to provide a fabricated gate valve body having means for effecting automatic lubricant sealing between the gate and seat elements of the valve.

An additional object is the provision of a fabricated gate valve employing a novel bonnet construction permitting ready removal and replacement of the gate elements.

Still another important object is the provision of an automatic lubricant-sealed through-conduit gate valve of large size, but of minimum weight as compared with more conventional valves of the same size.

A further object is the provision of a fabricated gate valve in which the inlet and outlet nozzles are defined in separate end members which also include the sealant reservoirs and the channels and passages for conducting the plastic sealant employed in valves of this type to the sealing surfaces of the gate and seats.

Another important object is the provision of a fabricated gate valve in which the inlet and outlet nozzles in the end members have integrally formed therewith a plurality of angularly spaced arms extending radially from the nozzles to form cages for bracing and re-enforcing the end walls of the body against distortion by internal pressures.

Yet another important object is the provision of a fabricated valve of the general character described employing a one-piece through-conduit gate in combination with axially reciprocable gate seats adapted to engage opposite sides of the gate and incorporating automatic lubricant sealing between the gate and seats.

Other and more specific objects and advantages of this invention will become apparent from the following detailed description when read in conjunction with the accompanying drawing which illustrates a useful embodiment in accordance with this invention.

In the drawing:

Fig. 1 is a side elevational view of the exterior of a gate valve in accordance with one embodiment of this invention;

Fig. 2 is a top plan view of the valve;

Fig. 3 is an end elevational view, partly in section, of the valve;

Fig. 4 is a vertical cross-sectional view of the valve taken along line 4—4 of Fig. 3;

Fig. 5 is a horizontal cross-sectional view of the valve taken along line 5—5 of Fig. 4;

Fig. 6 is an elevational view of the inner face of one of the end members of the valve;

Fig. 7 is a side elevational view of one of the end members of the valve;

Fig. 8 is an elevational view, partly in section, of the through-conduit gate element of the valve; and Fig. 9 is an end view of one of the gate seats having portions broken away to illustrate details thereof.

Referring to the drawing, the main part of the valve body, which houses the gate element, is constructed from a pair of parallel end plates 15—15 joined together along their longitudinal side edges by means of a pair of side plates 16—16 which are connected to the end plates by means of welding beads 17—17 to define therewith a generally rectanguglar structure enclosing a generally rectangular gate chamber 18. The lower end of gate chamber 18 is closed by means of a bottom plate 19 which is welded to the lower edges of end plates 15—15 by means of the transverse welding beads 20, similar connections, not shown, being provided between bottom plate 19 and side plates 16—16. End plates 15—15 are provided with co-axial openings 15a—15a for the reception of the conduit sections, as will be described subsequently. Mounted to each of the end plates is a conduit section, designated generally by the numerals 21—21. These conduit sections are identical in construction and the description will be limited, therefore, to one of them which will be applicable, of course, to the other. Conduit section 21 is generally a casting which includes, in integral form, a flow nozzle 22 having an axial passage 23 therethrough communicating with gate chamber 18 and defining a flow port for the valve, one of the passages 23 being the inlet and the other the outlet. At its inner end, nozzle 22 is formed with a cylindrical portion 24 which is reduced in external diameter near its outer end at 25 to be snugly received in opening 15a of the end plate. The reduction in external diameter of the end of nozzle 22 defines the external shoulder 26, which is adapted to abut the surrounding edge of opening 15a to limit the inward movement of the nozzle. The conduit section is rigidly secured to the end plate 15 by means of a circular weld 27 extending between cylindrical portion 24 and the adjacent face of end plate 15.

Conduit sections 21 provide re-enforcement for the end plates of the valve body by having integrally formed with each of the flow nozzles 22 a number of radially extending bracing arms to provide a star-shaped cage, the arms of which are rigidly welded to the end plates. One pair of arms 28—28 extend horizontally from opposite sides of the nozzle at the point intermediate the ends of the nozzle. At their outer ends arms 28 are turned toward the end plate to define the lips 29—29 (Figs. 6 and 7), which are rigidly secured by welding 30 to the side edges of plate 15 at points generally opposite the center of the flow-way through the valve. Extending from the lower side of the nozzle at substantially 90° to the arms 28 is a third arm 31 which, like arms 28, is turned toward end plate 15 to define the lip 32 which is adapted to be secured rigidly against the lower portion of end plate 15 by means of the weld 33 extending between the lower edge of lip 32 and the adjacent portion of end plate 15. Extending from its upper side opposite arm 31 is a generally T-shaped arm 34 comprising a thickened vertical section defining the boss 34a and a horizontal cross-piece 34b having a length substantially equal to the width of end plate 15. The inner face of arm 34 is flattened to abut the outer face of end plate 15 and cross-piece 34b extends above the upper ends of end plates 15 and side plates 16. The cross-piece 34b has a flat inner face which is provided with a semicircular recess 35 which extends the full length of the cross-piece. A weld 35a (Figs. 1 and 3) rigidly secures the forward face of arm 34 to end plate 15 horizontally along the lower edge of cross-piece 34b and vertically along the sides of arm 34. A generally rectangular bonnet 36, shaped to fit snugly between the inner faces of cross-pieces 34b, is removably insertable between the cross-pieces to seat against the upper ends of end plates 15 and side plates 16 and is provided along the sides adjacent cross-pieces 34b with semi-circular recesses 36a which complement recesses 35 and register therewith to form circular openings extending horizontally the full width of the valve body. The circular openings defined by recesses 35 and 36a are adapted to receive locking bolts 37 threaded at their outer ends and fitted with nuts 38 by which bonnet 36 may be effectively secured to the cross-pieces 34b. The lower end face of bonnet 36 is provided with a packing groove 37a, concentric with the periphery of the bonnet, in which is mounted a suitable packing 38a for forming a fluid-tight seal between the bonnet and the upper ends of plates 15 and 16 to thereby close the upper end of the gate chamber 18. A tubular boss 39 is integrally formed in the center of bonnet 36 and has an axial bore 40 therethrough for reception of an operating stem 41 which is reciprocable through bore 40. The boss is threaded internally to receive a tubular gland nut 42 for compressing seal packing about stem 41. The lower end of gland nut 42 is provided with internal packing 43, such as O-rings, adapted to form a fluid-tight seal between the gland nut and the exterior of stem 41, and an external seal packing 44, such as an O-ring, to form a fluid-tight seal between the gland nut and the bore of boss 39.

A one-piece through-conduit type gate 45, generally rectangular in shape, having flat parallel side faces and having a through-conduit port 46 through its lower end portion and a closure element 47 defined by its upper portion, is slidably disposed in gate chamber 18. The thickness of gate 45 is such that it will slide freely between the end plates and is provided on its longitudinal edges with oppositely extending guide flanges 48 which are shorter in length than the gate being disposed substantially equi-distantly from the upper and lower ends of the gate and which also are thinner than the gate so as to provide clear space between the flanges and end plates 15—15. The width of flanges 48 is such that their outer edges will have a free-sliding fit with side plates 16—16. At its upper end gate 45 is provided with a cylindrical socket 49 (Fig. 8) which is adapted to receive the lower end of stem 41. The diameter of socket 49 is made somewhat greater than the diameter of stem 41 to permit some degree of lateral movement of the gate with respect to the stem. A locking pin 50 is screwed through one edge of the gate to project into socket 49 and thence into a recess 51 provided in the periphery of the stem, whereby to lock the stem against rotation relative to the gate. The internal diameter of recess 51 is greater than the external diameter of pin 50 to allow the desired degree of relative lateral movement to accommodate the desired movement of the gate relative to the stem, without permitting relative rotation between the stem and the gate.

The reduced diameter portions 25 of the nozzles 22 are each counterbored in two steps to provide the larger diameter counterbore 55, defining the outwardly facing internal shoulder 56, and a smaller diameter counterbore 57 defining the outwardly facing internal shoulder 58, which is disposed, of course, rearwardly of shoulder 56. Slidably mounted in counterbore 55 is a seat ring 60 having an axial bore 61 which is substantially the same diameter as flow passage 23. The inner end of seat ring 60 is reduced in diameter to form the cylindrical neck 62 which is slidably receivable in the smaller diameter counterbore 57. The reduction in diameter of the seat ring to form neck 62 provides the inwardly facing annular shoulder 63 opposed to shoulder 56. The length of neck 62 is made somewhat greater than the length of counterbore 57 so that when the inner end of neck 62 is engaged with shoulder 58 a space 64 will be provided between shoulders 56 and 63. A coil spring 65 is mounted about neck 62 and seated in space 64 in compression between shoulders 56 and 63, whereby to normally urge the seat ring 60 outwardly of the counterbore and inwardly of the gate chamber toward the opposed face of gate 45. A slidable seal, such as an O-ring 66, is mounted between the exterior of seat ring 60 and counterbore 55 and a second slidable seal, such as O-ring 67, is mounted about the neck 62 between the latter and counterbore 57, these seals providing a slidable fluid-tight seal between the seat ring and portions 24 and 25 of the nozzles. The outer end of seat ring 60, outwardly of seal 66, is reduced somewhat in external diameter to define the annular space 60a between the seat ring and nozzle portion 25 which communicates with chamber 18.

The valve is provided with an automatic sealing system employing a lubricant-type sealant for sealing between the gate and both the upstream and downstream seats. Each of these systems comprises a sealant reservoir 70 formed in boss 34a of the arms 34. A threaded closure 71 is provided for the upper end of reservoir 70 and the latter has a slidable barrier or piston 72 slidably mounted therein for reciprocating movement in the reservoir. A channel 73 extends upwardly through boss 34a and communicates at its upper end with a port 74 opening into the upper end of reservoir 70. At its lower end channel 73 communicates with flow passage 23. Extending through the wall of boss 34a from the exterior thereof (Fig. 3), is a passageway 75 which communciates with the lower end of reservoir 70 below piston 72 and is closed by means of a conventional type of grease or lubricant supply fitting 76 by means of which sealant may be introduced into reservoir 70 below piston 72. An outlet channel 77 communicates at one end with the lower end portion of reservoir 70 below the piston 72 and at its other end communicates with space 64. A sealant feed passage 78 extends longitudinally through seat ring 60 and communicates at one end with the space 64 and at the other end with the outer end face of the seat ring. An annular groove 79 is formed in the outer end face of the seat ring and is spaced radially inwardly slightly from the point at which passage 78 opens to the seat face so that the groove 79 and passage 78 will normally be out of communication with each other. Each side face of gate 20 is provided with a recess 80 which is positioned to form a jumper or communication channel between passage 78 and groove 79 when the gate is in the closed position (Fig. 1), but which will be moved out of connecting relation with passage 78 and groove 79 when the gate moves upwardly toward its open position. Extending radially through the wall of seat ring 60 is a passage 81 (Fig. 9) which provides communication between the bore of the seat ring and the exterior thereof. A check valve 82, of any conventional construction and adapted to open inwardly, controls passage 81 so as to admit fluid pressure from the gate chamber through space 60a and passage 81 to the bore of seat ring 60, while preventing reverse flow of fluid from within the bore 61 of the seat ring into the gate chamber. A locking pin 83 extends radially between seat ring 60 and reduced diameter portion 25 in order to lock the seat ring against rotation about the axis of counterbore 55.

Because of the symmetrical construction, as described, it is obvious that either end of the valve may be the inlet and the other the outlet and the valve may thus be installed in pipe lines. As illustrated, the ends of nozzles 22 are chamfered for welding into a pipe line, but it will be understood that other types of connections or fittings may be provided on the ends of the nozzles. These may be screw connections or bolt flanges, as desired.

It will be seen that valves having the construction described may be readily assembled from plate members forming the body proper and two relatively light-weight castings forming the conduit sections which serve not only to provide the flow connections to the valve body but also to provide the re-enforcement by which pressure distortion of the rectangular valve body will be prevented, and the body effectively supported and strengthened against internal pressures. The bonnet 36 which completes the valve body is also a relatively light-weight casting.

The novel bonnet construction permits the ready removal and insertion of the bonnet when necessary to insert or remove the gate elements, merely by removing the nuts from the two bolts 37 and withdrawing the latter from between the sides of the bonnet and cross-pieces 34b. The reciprocable seat rings, in combination with the one-piece gate, will provide effective sealing on both the upstream and downstream sides of the gate when the latter is in the closed position, and the check valve controlled passages through the seat rings will permit relief of pressure trapped in gate chamber 18 into the downstream or low pressure side of the valve when the gate is in the closed position, thereby relieving high line pressure from the bonnet and the stem seals. Bottom wall 19 of the gate chamber may be provided with an inwardly projecting plug 85 to limit the downward movement of the gate in attaining its fully closed position in order to assure effective registration of jumpers 80 with the ends of passages 78 and grooves 79.

Valves fabricated in accordance with this invention will be at least 25% lighter in weight than more conventional designs, particularly for sizes above 10 inches, and will be correspondingly cheaper to manufacture. The novel re-enforcement of the body walls by the end cage element will make the body walls strongly resistant to distortion due to internal stresses and pressures.

It will be understood that various alterations and changes may be made in the details of the illustrative embodiment within the scope of the appended claims, but without departing from the spirit of this invention.

What I claim and desire to secure by Letters Patent is:

1. A fabricated gate valve comprising spaced parallel end and side plates welded together along their abutting longitudinal edges to define a generally rectangular body enclosing a generally rectangular gate chamber, a plate member secured by welding to the lower ends of the end and side plates to define a bottom closure for the gate chamber, separately fabricated conduit sections mounted on the respective end plates, each of said conduit sections including a tubular flow nozzle having one end projecting through the end plate into communication with the gate chamber and a bracing cage for the end plate comprising a plurality of radially extending bracing arms integral with the flow nozzle and having their outer ends curved toward the end plate adjacent its edges, welding rigidly securing said nozzle and the outer ends of said arms to the end plate, one of said arms extending upwardly from said flow nozzle and provided with a transverse cross-piece extending above and parallel to the upper end of the end plate, a rectangular bonnet-piece removably receivable between the cross-pieces into seating engagement with the upper ends of said end and side plates to form a closure for the upper end of said gate chamber, means releasably securing said bonnet-piece to said cross-pieces when the bonnet-piece is in said seating engagement, gate seat members mounted in the inner ends of said nozzles, a through-conduit gate member of generally rectangular shape reciprocable in the gate chamber between said gate seats, said gate member having flat parallel side faces slidably engageable with said gate seats, an opening in said bonnet-piece, and a gate stem extending through said opening and operably secured to the gate member.

2. A fabricated gate valve comprising spaced parallel end and side plates welded together along their abutting longitudinal edges to define a generally rectangular body enclosing a generally rectangular gate chamber, a plate member secured by welding to the lower ends of the end and side plates to define a bottom closure for the gate chamber, separately fabricated conduit sections mounted on the respective end plates, each of said conduit sections including a tubular flow nozzle having one end projecting through the end plate into communication with the gate chamber and a bracing cage for the end plate comprising a plurality of radially extending bracing arms integral with the flow nozzle and having their outer ends curved toward the end plate adjacent its edges, welding rigidly securing said nozzle and the outer ends of said arms to the end plate, one of said arms extending upwardly from said flow nozzle and provided with a transverse cross-piece extending above and parallel to the upper end of the end plate, a rectangular bonnet-piece removably receivable between the cross-pieces into seating engagement with the upper ends of said end and side plates to form a closure for the upper end of said gate chamber, means releasably securing said bonnet-piece to said cross-pieces when the bonnet-piece is in said seating engagement, annular gate seat members slidably mounted in the inner ends of said nozzles, a through-conduit gate member of generally rectangular shape reciprocable in the gate chamber between said gate seats, said gate member having flat parallel side faces slidably engageable with said gate seat members, means resiliently urging said seat members into sealing engagement with the side faces of the gate member, an opening in said bonnet-piece, and a gate stem extending through said opening and operably secured to the gate member.

3. A fabricated gate valve comprising spaced parallel end and side plates welded together along their abutting longitudinal edges to define a generally rectangular body enclosing a generally rectangular gate chamber, a plate member secured by welding to the lower ends of the end and side plates to define a bottom closure for the gate chamber, separately fabricated conduit sections mounted on the respective end plates, each of said conduit sections including a tubular flow nozzle having one end projecting through the end plate into communication with the gate chamber and a bracing cage for the end plate comprising a plurality of radially extending bracing arms integral with the flow nozzle and having their outer ends curved toward the end plate adjacent its edges, welding rigidly securing said nozzle and the outer ends of said arms to the end plate, one of said arms extending upwardly from said flow nozzle and provided with a transverse cross-piece extending above and parallel to the upper end of the end plate, a rectangular bonnet piece removably receivable between the cross-pieces into seating engagement with the upper ends of said end and side plates to form a closure for the upper end of said gate chamber, means releasably securing said bonnet-piece to said cross-pieces when the bonnet-piece is in said seating engagement, annular gate seat members slidably mounted in the inner ends of said nozzles, a through-conduit gate member of generally rectangular shape reciprocable in the gate chamber between said gate seats, said gate member having flat parallel side faces slidably engageable with said gate seat members, means resiliently urging said seat members into sealing engagement with the side faces of the gate member, passageways through the seat members providing communication between the gate chamber and the respective flow nozzles, check valve means in said passageways opening toward said flow nozzles, an opening in said bonnet-piece and a gate stem extending through said opening and operably secured to the gate member.

4. A fabricated gate valve comprising spaced parallel end and side plates welded together along their abutting longitudinal edges to define a generally rectangular body enclosing a generally rectangular gate chamber, a plate member secured by welding to the lower ends of the end and side plates to define a bottom closure for the gate chamber, separately fabricated conduit sections mounted on the respective end plates, each of said conduit sections including a tubular flow nozzle having one end projecting through the end plate into communication with the gate chamber and a bracing cage for the end plate comprising a plurality of radially extending bracing arms integral with the flow nozzle and having their outer ends curved toward the end plate adjacent its edges, welding rigidly securing said nozzle and the outer ends of said arms to the end plate, one of said arms extending upwardly from said flow nozzle and provided with a transverse cross-piece extending above and parallel to the upper end of the end plate, a rectangular bonnet-piece removably receivable between the cross-pieces into seating engagement with the upper ends of said end and side plates to form a closure for the upper end of said gate chamber, means releasably securing said bonnet-piece to said cross-pieces when the bonnet-piece is in said seating engagement, gate seat members mounted in the inner ends of said nozzles, a through-conduit gate member of generally rectangular shape reciprocable in the gate chamber between said gate seats, said gate member having flat parallel side faces slidably engageable with said gate seats, a sealant reservoir defined within said one of said arms, a passageway providing communication between the flow nozzle and the reservoir, conduit means for delivering sealant from said reservoir to the gate-engaging face of said gate seat member, an opening in said bonnet-piece, and a gate stem extending through said opening and operably secured to the gate member.

5. A fabricated gate valve comprising spaced parallel end and side plates welded together along their abutting longitudinal edges to define a generally rectangular body enclosing a generally rectangular gate chamber, a plate member secured by welding to the lower ends of the end and side plates to define a bottom closure for the gate chamber, separately fabricated conduit sections mounted on the respective end plates, each of said conduit sections including a tubular flow nozzle having one end projecting through the end plate into communication with the gate chamber and a bracing cage for the end seat comprising a plurality of radially extending bracing arms integral with the flow nozzle and having their outer ends curved toward the end plate adjacent its edges, welding rigidly securing said nozzle and the outer ends of said arms to the end plate, one of said arms extending upwardly from said flow nozzle and provided with a transverse cross-piece extending above and parallel to the upper end of the end plate, a rectangular bonnet-piece removably receivable between the cross-pieces into seating engagement with the upper ends of said end and side plates to form a closure for the upper end of said gate chamber, registering complementary semi-circular recesses extending longitudinally of the inner faces of the cross-pieces and the opposed edges of said bonnet-piece, bolts removably extending through said recesses to lock the bonnet-piece to said cross-pieces, gate seat members mounted in the inner ends of said nozzles, a through-conduit gate member of generally rectangular shape reciprocable in the gate chamber between said gate seats, said gate member having flat parallel side faces slidably engageable with said gate seats, an opening in said bonnet-piece and a gate stem extending through said opening and operably secured to the gate member.

6. A fabricated gate valve comprising spaced parallel end and side plates welded together along their abutting longitudinal edges to define a generally rectangular body enclosing a generally rectangular gate chamber, a plate member secured by welding to the lower ends of the end plates to define a bottom closure for the gate chamber, separately fabricated conduit sections mounted on the respective end plates, each of said conduit sections including a tubular flow nozzle having one end projecting through the end plate into communication with the gate chamber and a bracing cage for the end plate comprising a plurality of radially extending bracing arms integral with the flow nozzle and having their outer ends curved toward the end plate adjacent its edges, welding rigidly securing said nozzle and the outer ends of said arms to the end plate, one of said arms extending upwardly from said flow nozzle and provided with a transverse cross-piece extending above and parallel to the upper end of the end plate, a rectangular bonnet-piece removably receivable between the cross-pieces into seating engagement with the upper ends of said end and side plates to form a closure for the upper end of said gate chamber, registering complementary semi-circular recesses extending longitudinally of the inner faces of the cross-pieces and the opposed edges of said bonnet-piece, bolts removably extending through said recesses to lock the bonnet-piece to said cross-pieces, annular gate seat members slidably mounted in the inner ends of said nozzles, a through-conduit gate member of generally rectangular shape reciprocable in the gate chamber between said gate seats, said gate member having flat parallel side faces slidably engageable with said gate seat members, means resiliently urging said seat members into sealing engagement with the side faces of the gate member, an opening in said bonnet-piece, and a gate stem secured to the gate member and extending through said opening.

7. In a gate valve, a fabricated body construction comprising spaced parallel end and side plates welded together along their abutting longitudinal edges to define a generally rectangular body enclosing a generally rectangular gate chamber, a plate member secured by welding to the lower end of the body to form a bottom closure for the gate chamber, separately fabricated conduit sections mounted on the exterior of the respective end plates, each of said conduit sections including a tubular flow nozzle having one end projecting through the end plate into communication with the gate chamber and a bracing cage for the end plate comprising a plurality of radially extending angularly spaced bracing arms integral with the flow nozzle at points spaced outwardly from the end plate and having their outer ends curved toward the end plate adjacent its edges, welding rigidly securing said nozzle and the outer ends of said arms to the end plate, one of said arms extending upwardly from the flow nozzle and provided with a transverse cross-piece extending above and parallel to the upper end of the end plate, the opposing cross-pieces defining a rectangular enclosure above the upper end of the body, a rectangular bonnet-piece removably receivable in said enclosure into seating engagement with the upper end of the body to form a closure for the upper end of the gate chamber, and means releasably securing the bonnet-piece to said cross-pieces when the bonnet-piece is in said seating engagement with the upper end of the body.

8. In a gate valve, a fabricated body construction comprising spaced parallel end and side plates welded together along their abutting longitudinal edges to define a generally rectangular body enclosing a generally rectangular gate chamber, a plate member secured by welding to the lower end of the body to form a bottom closure for the gate chamber, separately fabricated conduit sections mounted on the exterior of the respective end plates, each of said conduit sections including a tubular flow nozzle having one end projecting through the end plate into communication with the gate chamber and a bracing cage for the end plate comprising a plurality of radially extending angularly spaced bracing arms integral with the flow nozzle at points spaced outwardly from the end plate and having their outer end portions turned toward the end plate adjacent its edges, welding rigidly securing said nozzle and the outer end portions of said arms to the end plate, a bonnet-piece for closing the upper end of the gate chamber, and means releasably securing said bonnet-piece to the upper end of the body.

No references cited.